United States Patent [19]
Bair et al.

[11] 4,216,806
[45] Aug. 12, 1980

[54] JUMP MECHANISM

[75] Inventors: Eugene C. Bair; Alan L. Kindig, both of Holland, Mich.

[73] Assignee: General Electric Company, Fort Wayne, Ind.

[21] Appl. No.: 949,268

[22] Filed: Oct. 6, 1978

[51] Int. Cl.² ............................................. B21F 3/04
[52] U.S. Cl. .................................. 140/92.1; 242/7.09
[58] Field of Search ...................... 140/92.1; 242/7.09

[56] References Cited

U.S. PATENT DOCUMENTS

| Re. 27,415 | 6/1972 | Cutler | 29/596 |
|---|---|---|---|
| 3,011,728 | 12/1961 | Klinksiek | 242/7.09 |
| 3,510,939 | 5/1970 | Smith | 140/92.1 |
| 3,514,837 | 6/1970 | Smith | 140/92.1 |
| 3,557,432 | 1/1971 | Pavesi | 140/92.2 |
| 3,575,219 | 4/1971 | Eminger | 140/92.1 |
| 3,579,791 | 5/1971 | Arnold | 140/92.1 |
| 3,625,261 | 12/1971 | Hill et al. | 140/92.1 |
| 3,672,026 | 6/1972 | Cutler et al. | 140/92.1 |
| 3,672,027 | 6/1972 | Arnold | 140/92.1 |
| 3,672,040 | 6/1972 | Arnold | 140/92.1 |
| 3,732,897 | 5/1973 | Arnold et al. | 140/92.1 |
| 3,851,682 | 12/1974 | Vogel et al. | 140/92.1 |
| 3,872,897 | 3/1975 | Droll et al. | 140/92.1 |
| 3,973,601 | 8/1976 | Arnold et al. | 140/92.1 |

Primary Examiner—Lowell A. Larson
Attorney, Agent, or Firm—Ralph E. Krisher, Jr.

[57] ABSTRACT

Methods and apparatus for developing a plurality of coils of conductive wire for use in magnetic cores are disclosed. In one embodiment, a coil turn forming assembly having a coil form portion with a plurality of turn-gauging steps thereon is employed to develop a plurality of coils. A flyer generates turns of wire about the coil turn forming assembly and a jump mechanism locates the turn-gauging steps in the path of the wire generating the turns. The jump mechanism includes a cam surface with a plurality of axially and radially displaced stops thereon. A cam follower which is movable with the coil form portion is provided to sequentially engage the cam stops. A control arrangement actuates the jump mechanism to move the cam surface radially allowing engagement of the cam follower with different stops of the cam surface to place different turn-gauging steps of the coil form in the path of the wire generating the turns. The coil turn forming assembly is thereby moved across the winding path to sequentially locate turn-gauging steps of the coil form in position to receive turns of wire as the follower follows the cam surface. The cam surface has a generally spiral staircase configuration and is disposed on a segment of a right circular cylinder. Different stops of the cam are presented to the cam follower by incrementally rotating the cylinder segment about the cylinder axis. Upon completion of a set of coils or coil group, a ratchet which has been incrementing the cam surface is rendered inoperative to allow resetting of the cam surface to an initial position for forming or developing another set of coils.

22 Claims, 5 Drawing Figures

JUMP MECHANISM

BACKGROUND OF THE INVENTION

This invention relates generally to the developing of wound coils for use in electromagnetic devices and more particularly to methods and apparatus for developing groups of wound coils of varying size for use in magnetic cores.

One known scheme for developing groups of coils for a stator of a dynamoelectric machine, such as an electric motor, has been to provide a coil form or arbor having a series of different steps for forming different size coils for a pole or coil group. A flyer may be rotated about the coil form to form one coil of the pole group, whereupon the flyer is shifted axially to position the wire path about the next step of the coil form for forming another coil of the pole group. This stepping of the flyer and winding process is repeated an appropriate number of times until the coil group is developed for a particular motor stator which is to receive the coils; whereupon, a next coil group is formed in a similar fashion. Several coil groups may be formed for a particular stator and then the coil groups are removed from the coil form; whereupon the coil groups are either hand-placed or machine inserted into the stator core.

In another type of coil developing or winding system such as, for example, systems of the type illustrated in Smith U.S. Pat. No. 3,510,939, Arnold U.S. Pat. No. 3,579,791, and Arnold U.S. Pat. No. 3,973,601 which are assigned to the assignee of the present invention and the entire disclosures of which are hereby incorporated herein by reference, a coil receiving means is mated with a coil form or mold in a position to receive coils thereon during operation of a turn dispensing flyer. With this type of arrangement, the flyer is fixed axially and rotates about the coil form to dispose conductor turns on steps of the form. Differently configured coils are developed by stepping or axially moving the coil form so as to position different steps of the coil form in the path of the conductor wire emanating from the flyer.

One known arrangement for stepping or moving different steps of a coil form into the path of conductor wire emanating from a flyer involves a series of solenoid operated stops or trip bars for engaging a jump plate or extension thereof which is interconnected for movement with the coil form. The trip bars are mechanically and electrically interconnected with the flyer so as to control the coil form stepping in accordance with the number of conductor turns and the position of the flyer relative to the coil form. Although it works well for many applications, this type of arrangement requires separate control components for each step which necessarily puts a practical limit on the number of steps that can be provided from complexity, economic and mounting standpoints. Further, the arrangement is mechanically interconnected with flyer movement which necessitates performance of the jump movement while the flyer is within a particular span of its rotational movement.

Another known approach for controlling axial movement of a coil form relative to a flyer for developing coils of a coil group involves attachment of stop blocks having axially displaced stop surfaces thereon to a jump plate. Latches which are operated by high speed cylinders alternately engage and disengage surfaces of their respective blocks, and thereby, control movement of the coil form relative to the flyer for developing the different coils. The arrangement is not mechanically interconnected with flyer rotation, and thus, stepping may be accomplished independent of flyer rotation.

However, it would be desirable to develop a new and improved coil form jump arrangement having a simplified control means. An arrangement which would be versatile in that it could provide for numerous variations in stepping movement including the number of steps so as to allow development of coils for several different motor designs. Further, it would be desirable if such arrangement could be economically constructed and mounted so that portions thereof could be easily and quickly interchanged to adapt to the different motor designs with a minimum of machine downtime. Still further, it would be desirable to have the jump arrangement capable of operating independently of flyer rotational position.

Accordingly, a general object of the present invention is to provide improved apparatus for developing a plurality of coils of conductive wire for use in magnetic cores and improved methods of developing at least one coil group having a predetermined number of serially connected coils of electrically conductive wire.

A more specific object of the present invention is to provide coil developing methods and apparatus which provide for reliable and economical manufacture of coils and which provide for easy conversion to adapt to the development of differently configured coils.

Another object of the present invention is to provide coil developing methods and apparatus which simplify control requirements.

Still another object of the present invention is to provide new and improved methods and apparatus for moving a coil form portion with a plurality of turn-gauging steps independently of the flyer rotation.

A further object of the present invention is to provide new and improved methods and apparatus for easily adapting to varying the number of jumps of a turn-gauging stepped coil form.

A still further object is to provide new and improved apparatus having a versatile, simplified and economical jump mechanism which is adaptable to differing incremental steps including a large number of relatively small steps.

These as well as other objects and advantageous features of the present invention will be in part apparent and in part pointed out hereinafter.

SUMMARY OF THE INVENTION

One method of developing a coil group having a plurality of serially connected coils of electrically conductive, wire which exemplifies the invention in one preferred form, involves positioning a step of a coil form having a plurality of steps thereon in the path of a conductive wire by engaging a follower connected for movement with the coil form and a stop of a cam having a plurality of stops thereon arranged in a generally spiral staircase configuration. The one method further involves winding turns of the conductive wire about the step of the coil form to develop a first coil of the coil group and intermittently moving the cam to change the particular cam stop with which the follower is engaged so that the follower sequentially engages different stops of the cam to move different steps of the coil form into the path of the wire for developing the remaining coils. Movement of the follower along the different stops of the cam may be facilitated by applying an urging force to the follower. Resetting of the cam and follower to begin development of another coil group may be accomplished by removing the follower from engagement with a cam stop and rotating the cam to align a predetermined stop of the cam with the follower. Intermittently moving the cam may include repeated actuation of a ratchet arrangement to rotate the cam and present different cam stops to the follower with the ratchet arrangement being disabled for resetting the cam to align the follower with the predetermined cam stop.

An apparatus is disclosed which exemplifies the invention in another preferred form and which may be used to carry out the above-described method for developing a plurality of coils of conductive wire to be used in a magnetic core. The apparatus in one form, includes a coil turn forming assembly having a coil form portion with a plurality of turn-gauging steps thereon, and a flyer arrangement for generating turns of the wire about the steps of the coil turn forming assembly. The apparatus further includes a jump means for locating the turn-gauging steps in the path of the wire generating the turns. The jump means includes a cam with a stepped cam surface of a generally spiral staircase configuration, and a cam follower which is movable in unison with the coil form portion and which moves along the cam surface. The apparatus still further includes a control means which is operative to move the cam so as to allow engagement of the follower with different steps of the cam surface. Movement of the follower along the different steps of the cam surface positions different turn-gauging steps of the coil form portion in the path of the wire generating the turns for developing the coils. A shock-absorbing resilient arrangement may be provided to cushion the impact of the follower against successive cam steps and a detent arrangement may be provided for preventing inadvertent cam movement. The control means may include a ratchet for incrementing the cam to present different steps thereof to the follower as well as an arrangement for disengaging the ratchet and returning the cam to an initial position. In another aspect, a mounting arrangement is provided for quickly changing cams when a different configuration or number of coils is to be developed.

BRIEF DESCRIPTION OF THE DRAWINGS

Corresponding reference numerals indicate corresponding parts throughout the several views of the drawings.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
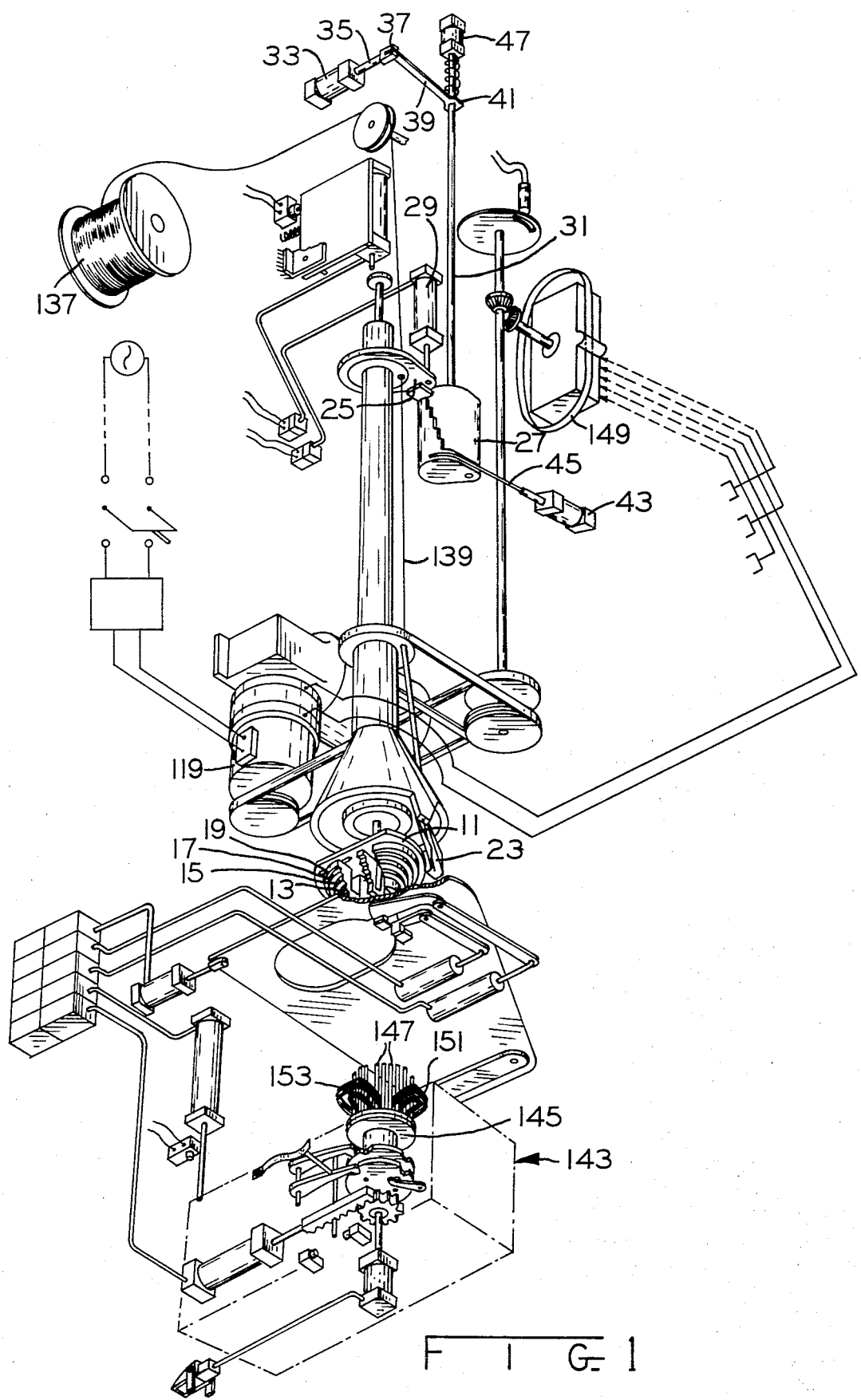
FIG. 1 is a simplified schematic perspective view of one form of coil developing apparatus incorporating the present invention in one form thereof and which is suitable for the practice of the preferred method with the view being from somewhat below the position of a machine operator.

Referring now to the drawings in general with primary reference to a coil developing apparatus schematically illustrated in FIG. 1, one preferred form of the invention may be practiced when developing coil groups each having a predetermined number of serially connected coils of electrically conductive wire. A first coil comprising a predetermined number of turns is wound on a first step 13 of a coil form 11 having a plurality of different size steps, such as 15, 17 and 19, in addition to the first step 13. After the first coil is developed on step 13, the coil form 11 is moved across a winding path defined generally by the plane traversed by the wire 21 (FIG. 3) from the winding head or flyer 23 to a particular turn-gauging step. This movement of the coil form locates the next step 15 of the coil form in position to receive turns of wire emanating from the flyer for developing a second coil. Sequential movement of the coil form to position its turn-gauging steps in the path of the flyer continues until the coils of a set of coils or coil group are established.

Figure 2:
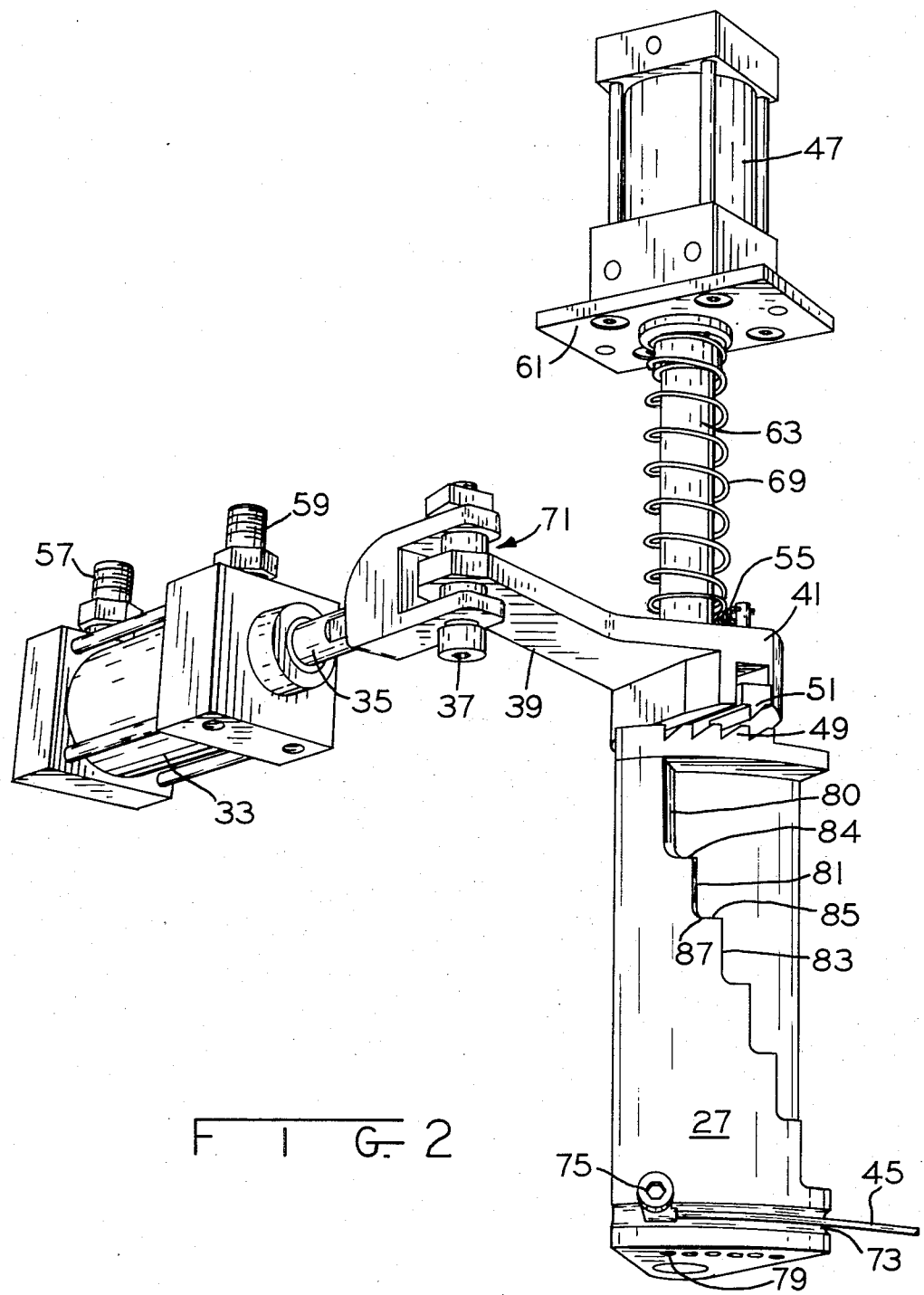
FIG. 2 is a perspective view of a portion of a jump mechanism schematically illustrated in FIG. 1.
Figure 3:
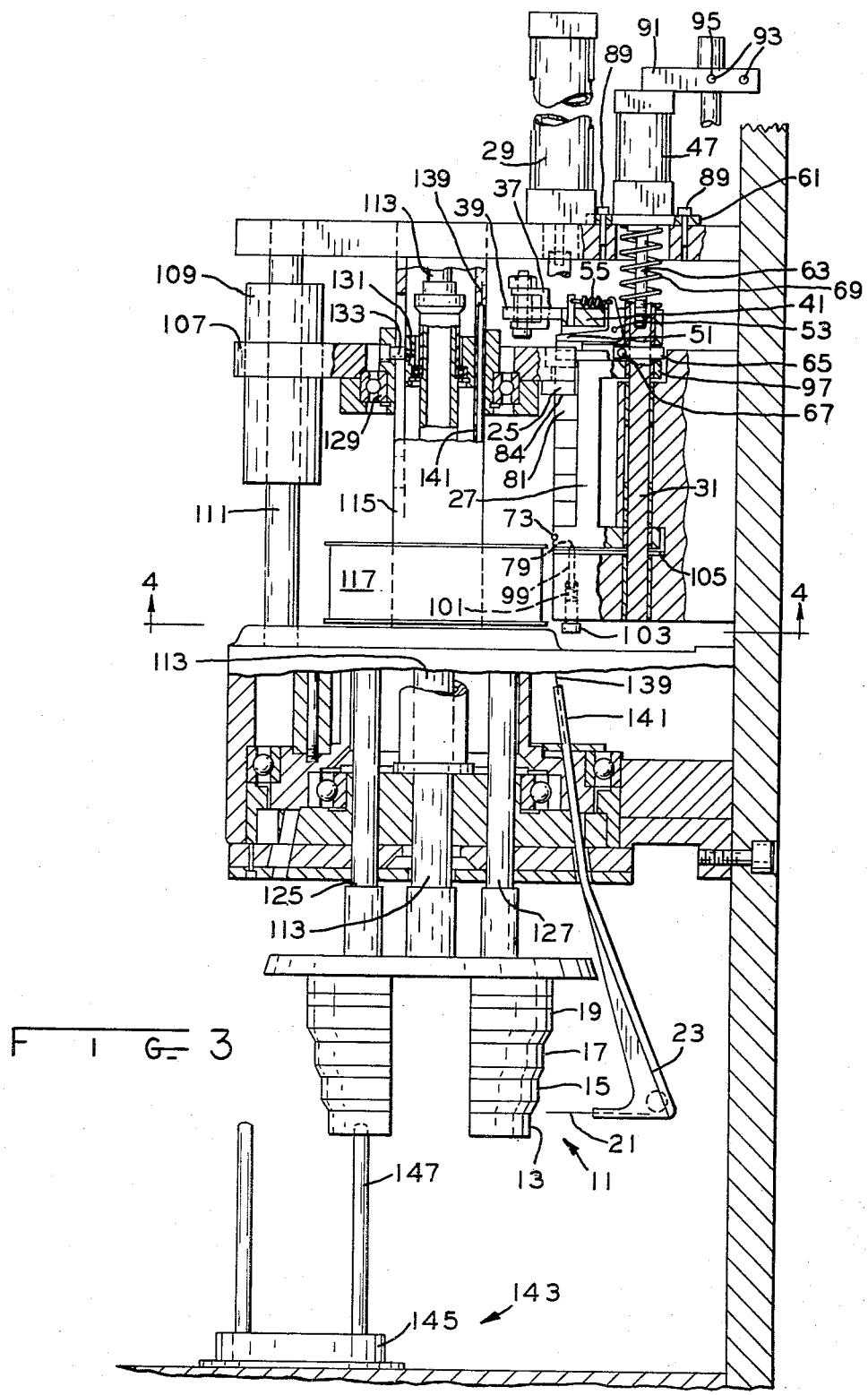
FIG. 3 is a broken side view, partly in cross-section, of a coil developing apparatus illustrating mounting details of the jump mechanism of FIG. 2.

The movement of the coil form for positioning each of its turn-gauging steps is controlled by a cam follower 25 which is interconnected for movement with the coil form 11 located a fixed axial distance therefrom and which limits downward (as viewed in FIG. 1) or transverse movement thereof. The cam follower limits movement of the coil form by engaging a cam surface on a segment of right circular cylinder or cam 27. As best seen in FIGS. 1, 2 and 3, this cam surface of the right circular cylinder has a generally spiral staircase configuration with stops thereof being sequentially engaged by the cam follower in order to position turn-gauging steps of the coil form in the path of the flyer for developing the plurality of coils.

Positive movement of the coil form 11 across the winding path is accomplished by extending cylinder 29, and thereby urging the coil form in the transverse or downward (as viewed in FIG. 1) direction. Cylinders such as 29 which are employed to carry out the herein-described operations may be, for example, solenoids, air cylinders, or hydraulic cylinders, as desired. The urging of the coil form in the transverse direction by cylinder 29 causes the cam follower 25 to engage a step or stop of the cam surface of cam 27. Such engagement of the cam follower with a stop of the cam 27 limits further axial or transverse movement of the coil form until a coil has been developed on the particularly positioned turn-gauging step of the form.

In order to sequentially position each of the desired turn-gauging steps in the path of the flyer for developing each of the coils, the cylinder segment or cam 27 is intermittently rotated about its axis, corresponding to shaft 31. This intermittent rotation is accomplished by intermittently actuating ratchet cylinder 33. As illustrated in FIG. 1, the ratchet cylinder 33 is connected by way of piston rod 35, coupling 37, and actuating arm 39 for causing rotation of ratchet 41 which in turn causes rotation of the cylindrical segment 27 about the axis corresponding to the shaft 31. Because there is no mechanical interconnection between the cam and the flyer 23, the rotation movement of the cam may be accomplished independently of the rotational point of the flyer. Rotation of the cam presents a new stop to the cam follower 25, thereby allowing the cam follower and the coil form to be moved downwardly or transversely to the winding path by the cylinder 29. Actuating the ratchet cylinder causes the cam to be ratcheted or moved through an angular distance which may be, for example, around 7.5°. Of course, it can be readily appreciated that other suitable means could be employed to sequentially rotate and reset the illustrated cam.

After a predetermined number of coils constituting a coil or pole group have been developed, a last turn-gauging step, such as 19, will be disposed in the path of the wire employed in generating the turns for each coil. The cylinder segment or cam 27 is then reset to an initial angular position so that the follower 25 engages a first or initial step of the cam in preparation for beginning development of a new coil group. Resetting of the cam may be accomplished by lifting ratchet 41 out of engagement with the top portion of cylindrical segment 27 (see FIG. 2), actuating cylinder 29 to retract follower 25 along with coil form 11, and actuating reset cylinder 43. Actuation of the reset cylinder pulls reset cable 45 which causes cylindrical segment 27 to move in a clockwise direction, as viewed in FIG. 1, back to its initial angular position. Disengagement of the ratchet 41 from the cylindrical segment 27 is achieved by actuating ratchet disengaging cylinder 47 to lift the ratchet 41 from engagement with corresponding teeth 49 (FIG. 2) along the upper portion of the cylindrical segment 27.

Figure 4:
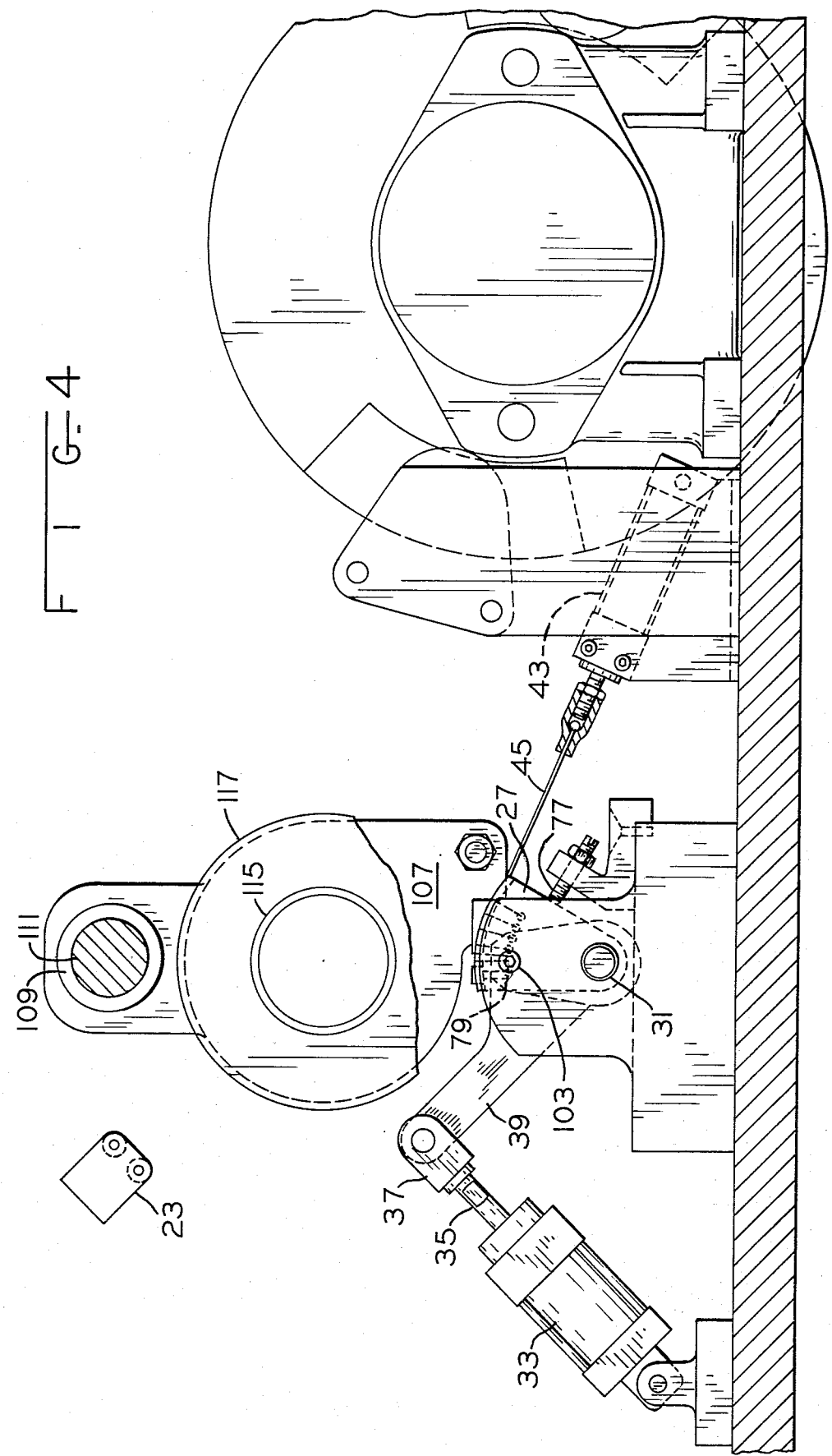
FIG. 4 is a bottom view of the apparatus of FIG. 3 illustrating further mounting details of the jump mechanism.

FIGS. 2-4 illustrate details of the ratchet and cam arrangement. As illustrated, the teeth 49 of the cylindrical segment or cam 27 are engaged by a ratchet paw 51 carried on ratchet 41. As best illustrated in FIG. 3, the ratchet paw is pivotally mounted about point 53 and spring loaded by spring 55. The ratchet 41 is actuated by the ratchet arm 39, which is connected to the ratchet cylinder 33 by way of the knuckle joint 37 and piston rod 35. The cylinder 33 is mounted on the machine frame, for example by threaded studs such as 57 and 59, and the machine frame also supports plate 61 (FIG. 3) which supports cylinder 47. In order to provide upward disengaging movement of the ratchet 41 for resetting the cam, the cylinder 47 has its shaft 63 connected to the cam shaft 31 and a split clamp 65 (FIG. 3) is mounted by way of bolt 67 about the shaft 31 between the ratchet 41 and the cam 27 for movement with the shaft. Actuation of the cylinder 47 moves the split clamp 65 and thus, moves the ratchet 41 upwardly, causing the ratchet paw 51 to disengage from the teeth 49. When the cylinder 47 is deactuated, coil spring 69 returns the paw 51 into engagement with the cam teeth 49. Some play is provided in the knuckle 37 as at 71 so that arm 39 may move up and down the distance of that free play as ratchet 41 is engaged and disengaged. Notice also that reset cable 45 resides in a cable groove 73 about a portion of the cylindrical periphery and is affixed to the cam 27, for example by cap screw 75.

After a coil group has been developed, the cam follower 25 (FIG. 1) is retracted by retracting the cylinder 29 (FIG. 1). The reset cylinder 43 is then actuated to pull the cable 45 for rotating the cam 27 back to a reset position as determined by adjustable stop 77 illustrated in FIG. 4. The cylinder 29 is again actuated to cause positive engagement of the cam follower with the first step of the cam 27; whereupon, the sequential ratchet movement of the cam is again performed to develop another group of coils upon the coil form 11 (FIG. 1) as discussed hereinabove.

Referring to FIG. 2 and 4, the cam 27, when ratcheted, rotates about its cylinder axis 31, which corresponds to the axis of the ratchet retracting rod 63. Detent openings, such as 79, may be provided to prevent inadvertent movement of the cam 27, as will be more completely described in reference to FIG. 3. As best illustrated in FIG. 2, the surface of the cam 27 includes a series of generally vertical discontinuities, such as 80, 81, and 83, having therebetween cam stops or steps, such as 84 and 85. The trace of this cam surface on the lateral surface of the cylindrical segment may include a fillet or rounded corner, such as 87, between the discontinuity or vertical portion of the cam surface and a cam stop, such as 85. The cam stops, such as 85, of course are engaged by the cam follower 25 in a manner more completely illustrated in FIG. 3.

The number of cam steps or stops may be varied according to the desired number of coils which are to be developed. The illustrated cam 27 is provided with six steps and can be utilized to develop as many as six coils when employed with an appropriate coil form having six turn-gauging steps. The cam can also be employed with coil forms having a lesser number of turn-gauging steps such as the coil form 11 (FIG. 1) having four steps to develop a lesser number of coils, for example, four. Further, a cam could be provided with as many as twelve steps for use with the illustrated ratchet cylinder 33 which ratchets or moves the cam in 7.5° increments. Of course, cams with more than twelve stops could be utilized by simply providing a ratchet cylinder which would rotate the cam in increments of less than 7.5° or a cylinder with an adjustable stroke could be provided. In many applications, it is preferred to provide an additional or extra step after a particular set or group of coils have been developed. This extra step facilitates movement or "shedding" of wire turns which may not have been previously moved onto a turn receiving device which is interfitted with the coil form for accepting the developed coils.

As illustrated in FIG. 3, a mounting arrangement is provided for quickly changing cams in order to minimize machine downtime when a different configuration of coils is desired. As illustrated in FIG. 3, the cylinder 47 is mounted on the plate 61 by loose fitting pins 89 and held vertically against the plate by a swivel plate 91. When a different configured cam is desired, cam 27 is removed by loosening mounting bolts 93 and pivoting the swivel plate about pivot point 95 away from the top of the cylinder 47. The split clamp 65 is then loosened allowing the cylinder 47 to be pulled upwardly until the shaft 31 clears upper disposed bearing 97 of the cam 27. The cam is then removed and another cam is inserted.

FIG. 3 also illustrates the cam follower or sear block 25 in engagement with cam stop 84 with the cam 27 being held in position by the detent pin 99. The detent member retains the cam rotational position by its extension into a detent hole such as 79, in the lower portion of the cam. The detent pin is urged upwardly by coil spring 101 which is held in the machine frame by cap screw 103. The detent member is moved downwardly or away from the detent hole causing compression of the coil spring during rotation of the cam; thus, allowing the cam follower 25 to move into engagement with another step of the cam surface. A resilient pad 105 of nylon or other shock-absorbing material is disposed between the cam 27 and the machine frame to absorb the impact of the cam follower 25 as it engages successive cam stops. This impact may, in some cases, be quite noticeable since engagement of another step of the cam involves movement of not only the cam follower 25 but also movement of plate 107, support bushing 109 which moves along a vertically extending alignment post 111, and the double ball-bearing arrangement which couples plate 107 to the coil form moving shaft or jump tube 113.

Figure 5:
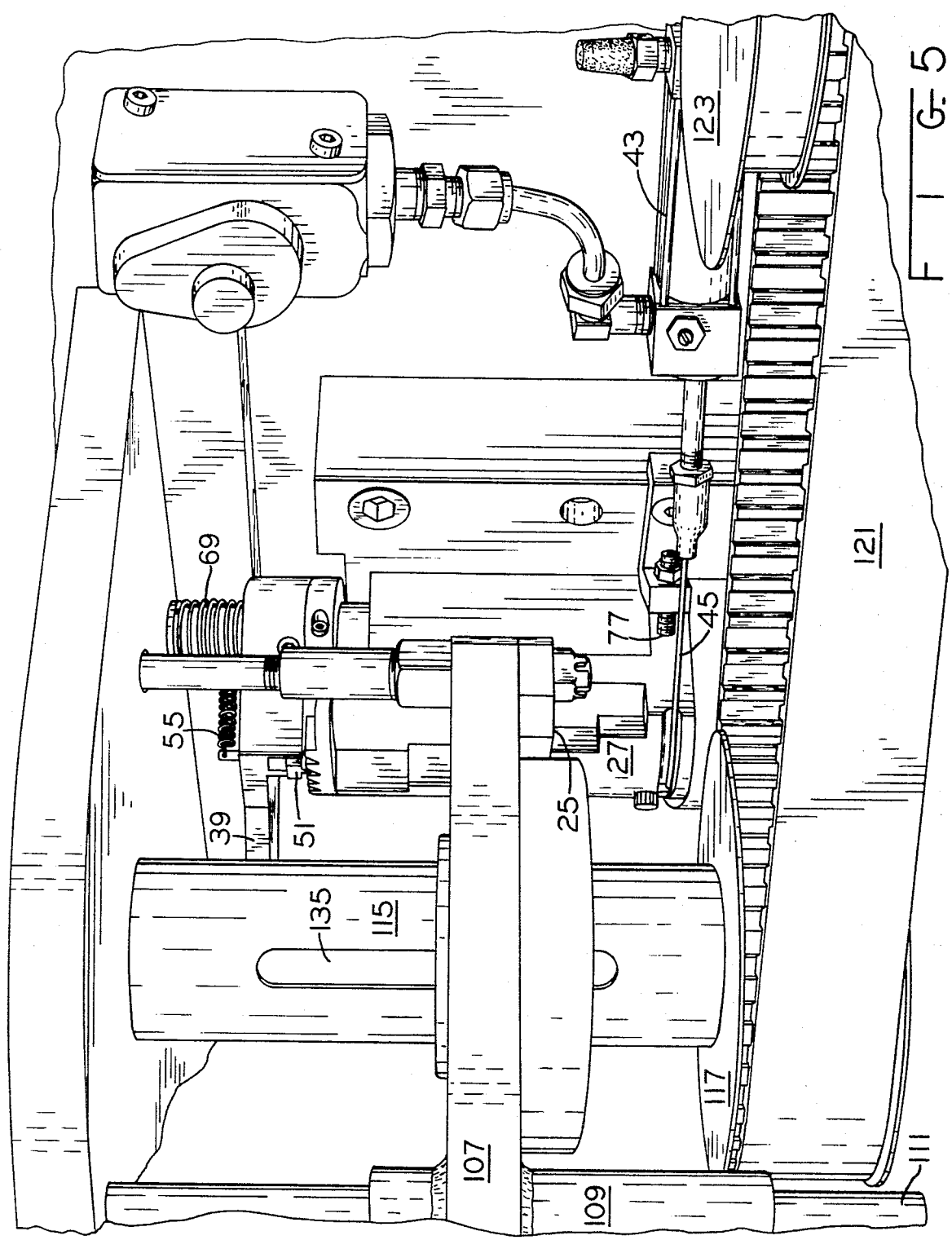
FIG. 5 is a partial perspective view of the jump mechanism schematically illustrated in FIG. 1 and viewed obliquely to the front of the apparatus.

As discussed hereinabove, coils for a coil group are developed by winding multiple turns of conductor wire about the turn-engaging steps of the coil form. The flyer is rotated about the coil form to establish the desired number of conductor turns for a coil and then the coil form is moved transverse to the winding path to position another turn-gauging step of the coil form for developing another coil. FIGS. 3 and 5 illustrate details of the winding machine or coil developing apparatus employed to accomplish such movements. As illustrated, outer shaft 115, which is driven by pulley 117, is coupled to and rotates with the flyer 23. As illustrated in FIG. 5, the pulley 117 is a toothed pulley arrangement coupled to winding machine drive motor 119 (FIG. 1) by way of a toothed belt 121 and an intermediate pulley 123. Of course, the pulley 117 could be coupled directly to the winding machine drive motor to accomplish the desired rotational movement. As illustrated in FIG. 3, jump tube 113, which is inside tube 115 is provided to accomplish transverse or axial movement of the coil form. The jump tube is movable axially but is prevented from rotating by a pair of alignment pins 125 and 127 which serve to maintain or fix the angular position of coil form 11. To interconnect cylinder 29 and plate 107 so that their axial movement produces axial movement of the jump tube, a pair of bearings is provided with the inner race 129 of the outer bearing connected mechanically to the outer race 131 of the inner bearing, by way of a rotating stud 133. Stud 133 slides vertically in a slot 135 (FIG. 5) in tube 115 and rotates therewith. This allows wire from a feed spool 137 (FIG. 1) to be supplied to the flyer 23 without interference with the jump mechanism. This wire is designated 139 at several locations along its feed tube 141 and is designated 21 as it moves from the flyer toward the coil form.

Referring again to FIG. 1, a coil-receiving assembly 143 is provided to receive a coil developed on the coil form 11. As illustrated, the coil receiving assembly, which includes a coil transfer mechanism 145, is supported for axial and rotary motion opposite the winding assembly and particularly the coil form 11. Finger elements 147 of the transfer mechanism 145 mate with the coil form in accordance with known prior art techniques. The different coils of a coil group are formed on different size steps of the coil form and deposited in the transfer mechanism with each of the coils spanning different finger elements of the transfer mechanism. After a first pole or coil group has been formed, the transfer mechanism is withdrawn, indexed, and again mated with the coil form so that a second coil group may be developed. Thereafter, the process is repeated until the desired number of coil groups for a given motor have been developed; whereupon, the transfer mechanism, with several coil groups thereon, is removed from the machine. Another coil transfer mechanism is then then positioned to replace the removed mechanism for receiving further developed coils.

The hereinabove described process may be substantially automated by, for example, employing a punched tape 149 in conjunction with control circuitry and actuating cylinders as is more completely described in the aforementioned U.S. Pat. Nos. 3,510,939 and 3,579,791. After coil groups such as 151 and 153 are developed and moved onto the transfer mechanism, the transfer mechanism is withdrawn from its mating relationship with the coil form 11. The winding arrangement is then reset to begin development of windings for another motor. Further operational and structural details of an arrangement for developing coil groups may be gleaned from the aforementioned U.S. Pat. Nos. 3,510,939 and 3,579,791.

Although embodiments of the present invention have been described and illustrated in terms of application in a vertical winding machine or apparatus, it should be readily apparent that methods and structures of the present invention may be readily applied in a horizontal winding apparatus. Further, it should be readily apparent that coils developed by teachings of the present invention could be transferred directly from a coil form into injection tooling for subsequent insertion into a stator core without the necessity of an intermediate transfer step to dispose the coils on injection tooling as described and illustrated herein.

From the foregoing, it is now apparent that a novel coil developing process as well as a novel apparatus for developing coil groups has been disclosed meeting the objects and advantageous features set out hereinbefore as well as others. It is also apparent that modifications as to the precise configurations, shapes and details, as well as the precise steps of the method, may be made by those having ordinary skill in the art without departing from the spirit of the invention or the scope thereof as set out by the claims which follow.

We claim:

1. A method of developing at least one coil group comprising a predetermined number of serially connected coils of electrically conductive wire, said method comprising: winding turns of conductive wire, for a first coil of the coil group, about a first step of a coil form having a plurality of different steps thereon; ratcheting a cam device having a plurality of stops thereon to disengage a stop thereof from a follower connected for movement with the coil form; moving the follower into engagement with another stop of the cam device, and thereby limiting movement of the coil form and locating another step of the coil form in a position for receiving turns of conductive wire for developing another coil of the coil group.

2. The method of claim 1 wherein ratcheting the cam device includes intermittently rotating the device; and moving the follower includes applying an urging force thereto, and thereby causing the follower to engage different stops of the cam device for positioning different steps of the coil form for receiving turns of conductive wire for developing the coils of the coil group.

3. The method of claim 1 including periodically resetting the cam device to an initial angular position to begin developing a new coil group.

4. The method of claim 1 further including resiliently supporting the cam device to absorb shock associated with the engagement of the follower with another stop of the cam device.

5. A method of developing at least one coil group comprising a predetermined number of serially connected coils of electrically conductive wire, said method comprising: positioning a step of a coil form having a plurality of steps thereon in the path of a conductive wire by engaging a follower connected for movement with the coil form and a stop of a cam having a plurality of stops thereon arranged in a generally spiral staircase configuration; winding turns of conductive wire, for a first coil of the coil group, about the step of the coil form; and intermittently moving the cam to change the particular cam stop with which the follower is engaged and thereby positioning different steps of the coil form in the path of a fixed winding plane of the conductive wire for developing the remaining differently configured coils of the coil group.

6. The method of claim 5 including applying an urging force transversely relative to the conductive wire path to facilitate positioning of the steps of the coil form for receiving turns of wire to develop the differently configured coils of the coil group.

7. The method of claim 5 including resetting the cam and follower after the coil group has been developed so as to engage the follower and a predetermined cam stop to begin developing a new coil group.

8. The method of claim 7 wherein the resetting of the cam and follower includes removing the follower from engagement with a cam stop and rotating the cam to align the predetermined cam stop with the follower.

9. The method of claim 5 wherein intermittently moving the cam includes actuating a ratchet arrangement to rotate the cam to present a different cam stop to the follower.

10. The method of claim 9 further including disabling the ratchet after the required number of coils have been developed on the coil form and applying a restoration force to align the follower with a predetermined cam stop.

11. Apparatus for developing a plurality of coils of conductive wire for use in a magnetic core, said apparatus comprising: a coil turn-forming assembly including a coil form portion having a plurality of turn establishing steps; flyer means for generating turns of wire about said coil turn-forming assembly; jump means for locating the turn establishing steps in the path of a fixed winding plate of the wire being generated as turns by the flyer means, said jump means including a cam having a stepped cam surface of a generally spiral staircase configuration and said jump means also including a cam follower movable in unison with the coil form portion and along the cam surface; and control means operative to move the cam so as to position different steps of the cam surface in engagement with the cam follower, and thereby, position different turn establishing steps of the coil form portion in the part of the fixed winding plane of the wire generating the turns for developing the plurality of coils.

12. The apparatus as set forth in claim 11 further including shock absorbing means for cushioning the impact of the follower with successive cam steps.

13. The apparatus as set forth in claim 11 further including detent means for preventing inadvertent cam movement.

14. The apparatus as set forth in claim 11 wherein the control means includes ratchet means for incrementing the cam to present different steps of the cam surface to the cam follower.

15. The apparatus as set forth in claim 14 further including means for disengaging the ratchet means, and means operative when the ratchet means is disengaged to return the cam to an initial position.

16. Apparatus for developing a plurality of coils of conductive wire for use in a magnetic core, said apparatus comprising: a coil turn-forming assembly including a coil form having a plurality of turn establishing steps; flyer means for generating turns of wire about said coil turn-forming assembly; jump means for locating said turn establishing steps in the path of a fixed winding plane of the wire generating the turns including a cam surface having a plurality of axially and radially displaced stops, and a cam follower connected for movement with the coil form portion and movable along the stops of the cam surface; and means for moving the cam surface radially and thereby allowing engagement of the cam follower with a different stop of the cam surface to plate a different turn establishing step in the path of a fixed winding plane of the wire generating the turns for developing differently configured winding turns of conductive wire for the coil.

17. The apparatus as set forth in claim 16 wherein the cam surface is formed on a segment of a right circular cylinder.

18. The apparatus as set forth in claim 16 wherein the means for moving the cam surface includes ratchet means for incrementing the cam surface to allow engagement of the cam follower with different cam stops.

19. The apparatus as set forth in claim 18 further including means for disengaging the ratchet means after development of a plurality of coils, and means operative when the ratchet means is disengaged to return the cam surface to an initial position preparatory to the development of a next plurality of coils.

20. Apparatus for devloping a plurality of coils having a plurality of conductive wire turns for use in a magnetic core, said apparatus comprising:
a coil form having a plurality of differently sized turn forming regions;
flyer means for generating turns of wire in a fixed winding plane;
means coupled to the coil form for positioning the coil form relative to the fixed winding plane; and
means for advancing the means for positioning through the fixed winding plane so that a plurality of predetermined conductive wire turns may be wound on each of the differently sized turn forming regions, said means for advancing comprising a generally cylindrical member having a spiral staircase configuration forming a plurality of mutually spaced apart steps for engaging and disengaging a member coupled to the means for positioning, whereby rotation of the cylindrical member causes the means for positioning to sequentially position in incremental steps, corresponding to spacings between the steps of the cylindrical member, the coil form through the fixed winding plane.

21. A method for developing a plurality of coils, having a plurality of conductive wire turns, for use in a magnetic core, said method comprising the steps of:
positioning a coil form having a plurality of differently sized and spaced apart turn forming regions relative to a flyer means generating turns of wire in a fixed winding plane;
generating a predetermined number of turns of wire in the fixed winding plane about a first turn forming region for a first coil; and
sequentially advancing the coil form through the same fixed winding plane to generate a predetermined number of turns of conductive wire about the second and remaining plurality of differently sized turn forming regions to develop a first coil group, by a ratchet arrangement which incrementally and in a direction substantially perpendicular to the fixed winding plane moves the coil form incremental distances corresponding to distances between the turn forming regions of the coil form, to thereby allow each of the differently sized turn forming regions to have wound thereabout a desired predetermined number of turns of conductive wire.

22. Apparatus for developing a plurality of coils having a plurality of conductive wire turns for use in a magnetic core, the apparatus including a coil form having a plurality of differently sized turn forming regions, a flyer means for generating turns of wire in a fixed winding plane, means coupled to the coil form for positioning the coil form relative to the fixed winding plane, and means for advancing the means for positioning through the fixed winding plane so that a plurality of predetermined conductive wire turns may be wound on each of the differently sized turn forming regions, wherein the improvement comprises: an improved means for advancing including a generally cylindrical member having a spiral staircase configuration forming a plurality of mutually spaced apart steps for engaging and disengaging a member coupled to the means for positioning, whereby rotation of the cylindrical member causes the means for positioning to sequentially position in incremental steps, corresponding to spacing between the steps of the cylindrical member, the coil form though the fixed winding plane.

* * * * *